Figure 1:
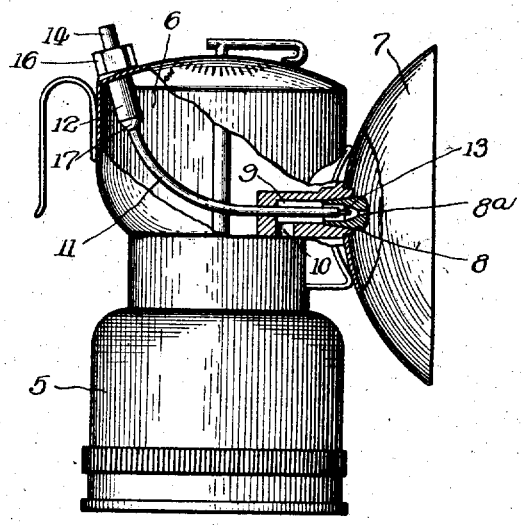

May 15, 1923. Re. 15,598

J. W. JACOBSON ET AL

CLEANER FOR BURNERS OF CARBIDE LAMPS AND THE LIKE

Original Filed Sept. 3, 1920

Inventor:
Jacob W. Jacobson,
John Emil Turja,
By Wilkinson Huxley Byron & Knight
Atty Witness:
A. J. Sauser.

Reissued May 15, 1923. Re. 15,598

UNITED STATES PATENT OFFICE.

JACOB W. JACOBSON AND JOHN EMIL TURJA, OF HANCOCK, MICHIGAN, ASSIGNORS, BY MESNE ASSIGNMENTS, TO GRIER BROTHERS COMPANY, OF PITTSBURGH, PENNSYLVANIA, A CORPORATION OF PENNSYLVANIA.

CLEANER FOR BURNERS OF CARBIDE LAMPS AND THE LIKE.

Original No. 1,397,170, dated November 15, 1921, Serial No. 407,953, filed September 3, 1920. Application for reissue filed May 8, 1922. Serial No. 559,430.

*To all whom it may concern:*

Be it known that we, JACOB W. JACOBSON and JOHN EMIL TURJA, citizens of the United States, residing at Hancock, in the county of Houghton and State of Michigan, have invented certain new and useful Improvements in Cleaners for Burners of Carbide Lamps and the like, of which the following is a specification.

Our invention relates to carbide lamps and the like and especially to a means for cleaning the lamps without having to extinguish the light.

Our invention relates particularly to means for cleaning burners of carbide lamps without having to extinguish the light or remove the lamp from its position on the wearer's person. The invention is of such nature that dirt may be discharged from the chamber outwardly and not forced inwardly into the gas conduit.

An object of our invention is to provide means for keeping burners of carbide lamps clean.

Another object of our invention is to provide means for freeing burners from any substance which may enter from either end thereof.

A further object is to provide means for cleaning burners of carbide lamps without having to extinguish the light and without having to remove the lamp from the person of the wearer or change its position in any respect.

A still further object is to provide means for cleaning burners of carbide lamps which means are operated from outside the lamp.

A yet further object is to provide cleaning means for burners of the class described with means for guiding the cleaning element in its cleaning movement.

A still further object is to provide cleaners for carbide lamps which may be readily replaced when worn.

A still further object is to provide cleaning means for burners of carbide lamps for successful, commercial use.

Generally speaking, we carry out our invention by providing a tube, one end of which terminates near the burner opening, and the other end of which communicates with the exterior of the lamp. Within the tube a wire is so positioned as to be moved longitudinally or rotatively. A suitable button or like member is carried in the outer end of the tube for imparting movement to the wire, so that a slight pressure on the button will project the other end of the wire into the burner opening dislodging any foreign matter therein.

Our invention will be described in the following specification and drawings, and particularly pointed out in the appended claims.

Reference is made to the drawings wherein:—

Figure 2:
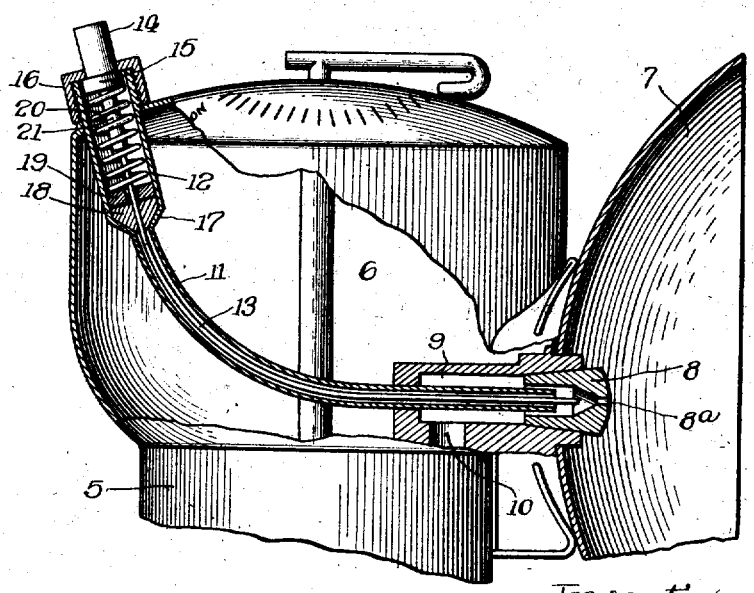

Figure 1 is a side elevational view with parts broken away of a miner's carbide lamp embodying the preferred form of our invention; and Figure 2 is an enlarged view similar to Figure 1 and showing details of construction of the cleaner and its associated parts.

In the drawings we have endeavored to illustrate the invention as applied to a miner's lamp such as may be readily carried on the head-piece of the wearer, or in any other position on his person as mining conditions demand. The lamp includes the usual lower portion 5 for the reception of carbide with the upper portion 6 for water. A reflector 7 is provided, at the focus of which the burner 8 is supported. The burner 8 is inserted in the outer end of a gas conduit 9 which communicates by means of an opening 10 with the carbide chamber 5 of the lamp. The burner which we prefer to use is similar to that shown in the drawings so as to be readily inserted or removed from the conduit as the occasion demands. The outer surface of the burner is curved to prevent the lodgment of foreign matter thereon.

The present method of cleaning burners of carbide lamps, especially of miner's carbide lamps, is for the wearer to carry a cleaning wire which he inserts through the burner opening from the outside, pushing the foreign matter in the opening into the gas conduit. This method of cleaning demands that the light be extinguished. To perform the cleaning operation underground, it is necessary that the miner provide other means of light while cleaning his lamp. In many instances miners use the carbide lamps for igniting fuses to discharge dynamite. The instant the fuse becomes ignited, it spits powder and many times the powder clogs the opening in the lamp burner and stops the light. When this occurs, the miner is in darkness and is subjected to hazard unless he has provided other means of illumination.

Our invention overcomes all of the above objections and makes the cleaning of the burners of carbide lamps a momentary one which may be accomplished by pressing a button on the outside of the lamp and without having to remove the lamp from its position or extinguish the light. Our cleaner operates in such manner as to discharge dirt from the inside of the burner to the outside thereof, thereby eliminating any possible clogging in the gas conduit.

We employ the tube 11 having an enlarged upper end 12, the outer end of the tube 11 being positioned to terminate within the rear end of the burner 8 and short of a burner opening 8[a] therethrough. The cleaning member or wire 13 is carried within the tube 11 and is of sufficient length to be projected outwardly of the outer end of the tube and into the burner opening 8[a]. For reciprocating the cleaning member 13, a push button 14 is provided which is reciprocally mounted in the enlarged end 12 of the tube 11. The button has a shoulder 15 adapted to engage the under side of the cap 16, which is in screw threaded engagement with the upper end of the enlargement 12, and which cap 16 serves as a closure for said enlargement. Connecting the tube 11 and the walls of the enlargement 12 is an inclined portion 17. Within the member 12 and against the shoulder 17 is a suitable packing material 18 and overlying the packing is a washer 19, which washer guides the wire or cleaning member 13 into the tube 11. A spring 20 is interposed between the washer 19 and the shoulder 15 of the button to maintain the button and its connected cleaning member 13 in inoperative or withdrawn position which is the normal position of the parts. The button has a shank 21, to which the upper end of the cleaning wire or member 13 is attached. The shank serves also to retain the spring 20 in position against the button 14. The diameter of the cleaning wire or member is slightly less than the diameter of the burner opening 8[a], so that when the wire is projected into the opening, the light will not be extinguished.

It is believed that the operation of our invention will be apparent to those skilled in the art.

It will be observed that the cleaning member 13 may be projected into the burner opening 8[a] at any time by pushing the button 14, so that the burner may be cleaned as many times as necessary without extinguishing the light and without having to remove the lamp from the person of the wearer. In view of the fact that the dirt is pushed out of the burner tube 8 and not back into the gas conduit, all liability of clogging is removed, the cleaning operation being effected in a portion of a second. If the burner is clogged, so as to not be thoroughly cleaned by a push of the button, the button may be turned to rotate the wire to clean out the obstruction in the burner opening.

Our invention is applicable to lamps of various sorts, where there is a tendency to clog the burner opening, but has been found very useful in connection with miner's carbide lamps, as the light is never extinguished and the miner is not prevented from doing his full share of his day's work, by frequently having to stop to clean his lamp.

Whenever it is desirable to replace a cleaner 13, the cap 16 is unscrewed permitting withdrawal of the button, spring, and cleaner, and the insertion of a new cleaner, button, and spring if they are needed.

While we have described more or less precisely the details of construction of our invention, we do not wish to be understood as limiting ourselves thereto, as we contemplate changes in form and the proportion of parts and substitution of equivalents as circumstances may suggest or render expedient, without departing from the spirit of our invention.

We claim:

1. In combination with a carbide lamp comprising a shell having a pierced burner carried thereby, a flexible cleaning wire supported in the shell and having its operative end located adjacent the burner opening, the opposite end of the wire extending adjacent to the shell of the lamp and being provided with an operating member extending externally of the lamp upon the upper rear portion thereof, and means for holding the wire normally retracted.

2. In combination with a carbide lamp comprising a shell having a pierced burner carried in the front of said shell, a flexible cleaning wire supported in the shell and having its operative end normally located opposite and slightly in rear of the burner opening, the opposite end of the wire extending adjacent to the shell of the lamp and being provided with an operating member extending externally of the lamp, upon the upper rear portion thereof in alignment with said wire.

3. In combination with a carbide lamp comprising a shell having a pierced burner carried thereby, a flexible cleaning wire supported in the shell and having its operative end located adjacent the burner opening, the opposite end of the wire being provided with an operating member upon the upper rear portion thereof where it is easily reached when the lamp is worn by the user for pushing the wire into the burner opening to clean it, and means within the lamp shell adapted to guide the flexible wire in a curved path intersecting the burner opening and means for retracting the wire.

4. In combination with a carbide lamp having a pierced burner, a wire mounted in the lamp to have its operative end projected into the burner opening, and a push button connected with the other end of the wire and located on the lamp in a position easily reached when the lamp is carried on the head piece of the user and a spring for retracting the wire and thrusting the button outwardly.

5. In combination with a carbide lamp having a pierced burner, a wire mounted in the lamp and having its operative end located adjacent the burner opening, and means connected with the other end of the wire extending through the shell in substantial alignment with the end of the wire at a point on the lamp above the plane of the burner and easily reached when the lamp is carried on the head piece of the user and adapted to be operated by the user to project the wire into the burner opening to clean it.

6. In combination with a carbide lamp having a pierced burner, a flexible cleaning wire mounted in the lamp and having its operative end located adjacent the burner opening, and its other end located adjacent the shell of the lamp, means within the lamp for guiding the flexible wire in a curved path intersecting the burner opening, means for normally holding the wire retracted, and manually operable means connected with the other end of the wire and located above the plane of the burner for pushing the wire through its guide to project its operative end into the burner opening to clean it.

7. In combination with a carbide lamp or the like comprising a gas compartment, a water compartment above said gas compartment, and a burner tip at the front of said lamp and communicating with said gas compartment, of a cleaning device comprising a flexible wire traversing the water compartment and having its operative end normally located opposite the rear of the burner tip opening, an operating member attached to the opposite end of said wire and extending exteriorly of said water compartment, and means within said lamp for guiding said flexible wire into the burner opening.

8. In combination with a carbide lamp or the like, comprising a gas compartment, a water compartment above said gas compartment, a burner tube at the front of the lamp and adjacent the bottom of the water compartment, said tube communicating with the gas compartment, and a burner tip in the outer end of said tube, of a cleaning device comprising a tube extending through the water compartment and having one end opening into the burner tube and the other end opening through a wall of the water compartment, a flexible wire in said tube having its operative end normally located opposite to and slightly in rear of the burner tip opening, and an operating member attached to the opposite end of said wire.

9. In combination with a carbide lamp or the like having a pierced burner, a tube having an end adjacent and alined with said pierced opening and its opposite end extending through the lamp shell and being shouldered adjacent said shell, a wire in said tube, a button attached to said wire and extending out of said tube beyond the shell, and a spring in said shouldered portion of the tube and engaging said button to urge said button outwardly, pressure on said button serving to compress the spring and cause the wire to enter the burner.

10. In combination with a carbide lamp or the like having a pierced burner, a tube having one end adjacent and alined with said pierced opening and its opposite end extending through the lamp shell and being shouldered adjacent said shell, a wire in said tube, packing surrounding the wire and fitting in said shouldered portion of the tube, a button attached to said wire and extending out of said tube beyond the shell, and a spring in said shouldered portion of the tube bearing on said packing and engaging said button to urge said button outwardly, pressure on said button serving to compress the spring and cause the wire to enter the burner.

11. In combination with a carbide lamp or the like having a pierced burner, a tube having one end adjacent and alined with said pierced opening and its opposite end extending through the lamp shell and being shouldered adjacent said shell, a wire in said tube, a button attached to said wire and extending out of said tube beyond the shell, a cap detachably attached to said tube and limiting outward movement of the button, and a spring in said shouldered portion of the tube and engaging said button to urge said button outwardly, pressure on said button serving to compress the spring and cause the wire to enter the burner.

12. In combination with a carbide lamp or the like having a pierced burner, a tube having one end adjacent and alined with said pierced opening and its opposite end extending through the lamp shell and being shouldered adjacent said shell, a wire in said tube, a button attached to said wire and extending out of said tube beyond the shell, a cap detachably attached to said tube and limiting outward movement of the button, and a spring in said shouldered portion of the tube engaging said button to urge said button outwardly, pressure on said button serving to compress the spring and cause the wire to enter the burner, said sleeve being detachable to permit removal of the button, wire and spring while the lamp is lighted.

13. In combination with a carbide lamp or the like having a pierced burner, a tube having an end adjacent and alined with said pierced opening and its opposite end extending through the lamp shell and being shouldered adjacent said shell, a wire in said tube, packing in said shouldered portion around the wire, a guide washer on said packing, a button on said wire extending out of said tube beyond the shell, and a spring surrounding the wire between the button and guide washer and adapted to urge the button outwardly, pressure on said button serving to compress the spring and cause the wire to enter the burner.

Signed at Hancock, Michigan, this 21st day of April, 1922.

JACOB W. JACOBSON.
JOHN EMIL TURJA.